Aug. 1, 1967  D. H. MELBYE  3,333,884
TRAILERS
Filed July 29, 1965  2 Sheets-Sheet 1
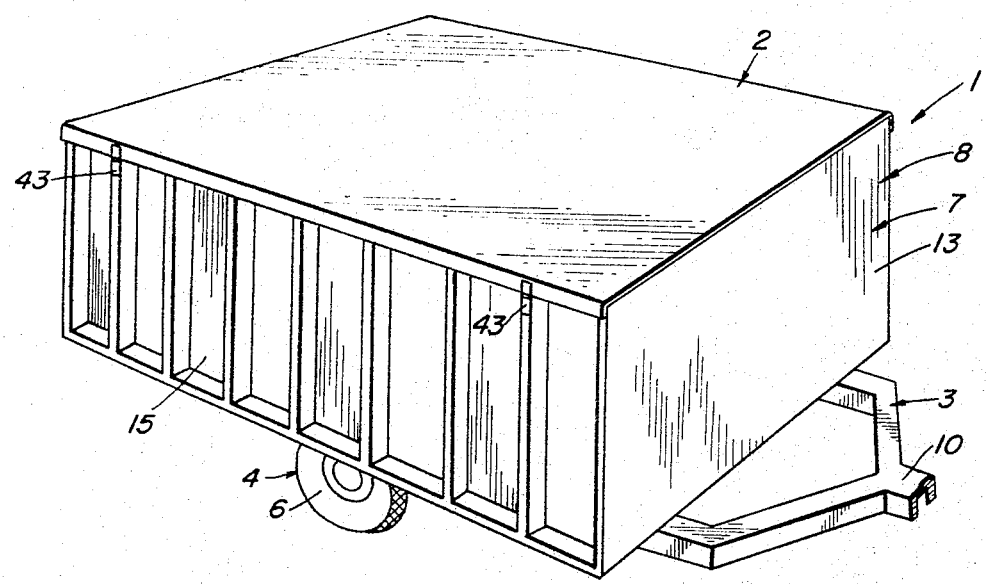
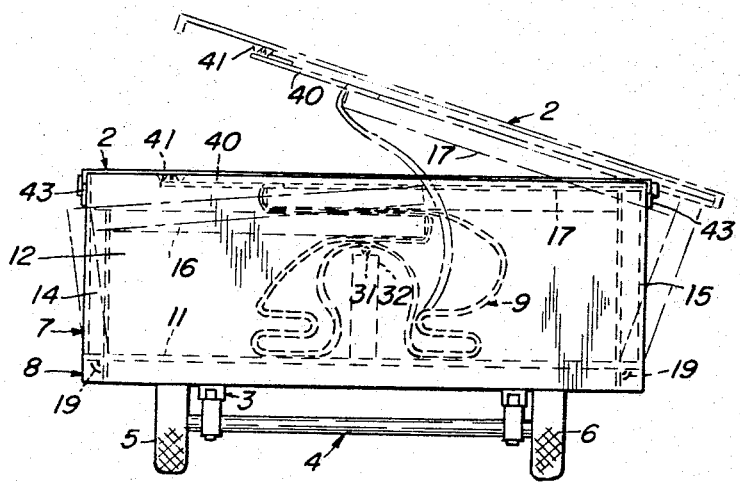
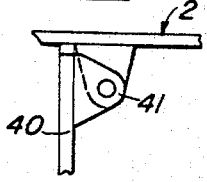 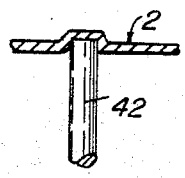
INVENTOR
DAVID H. MELBYE

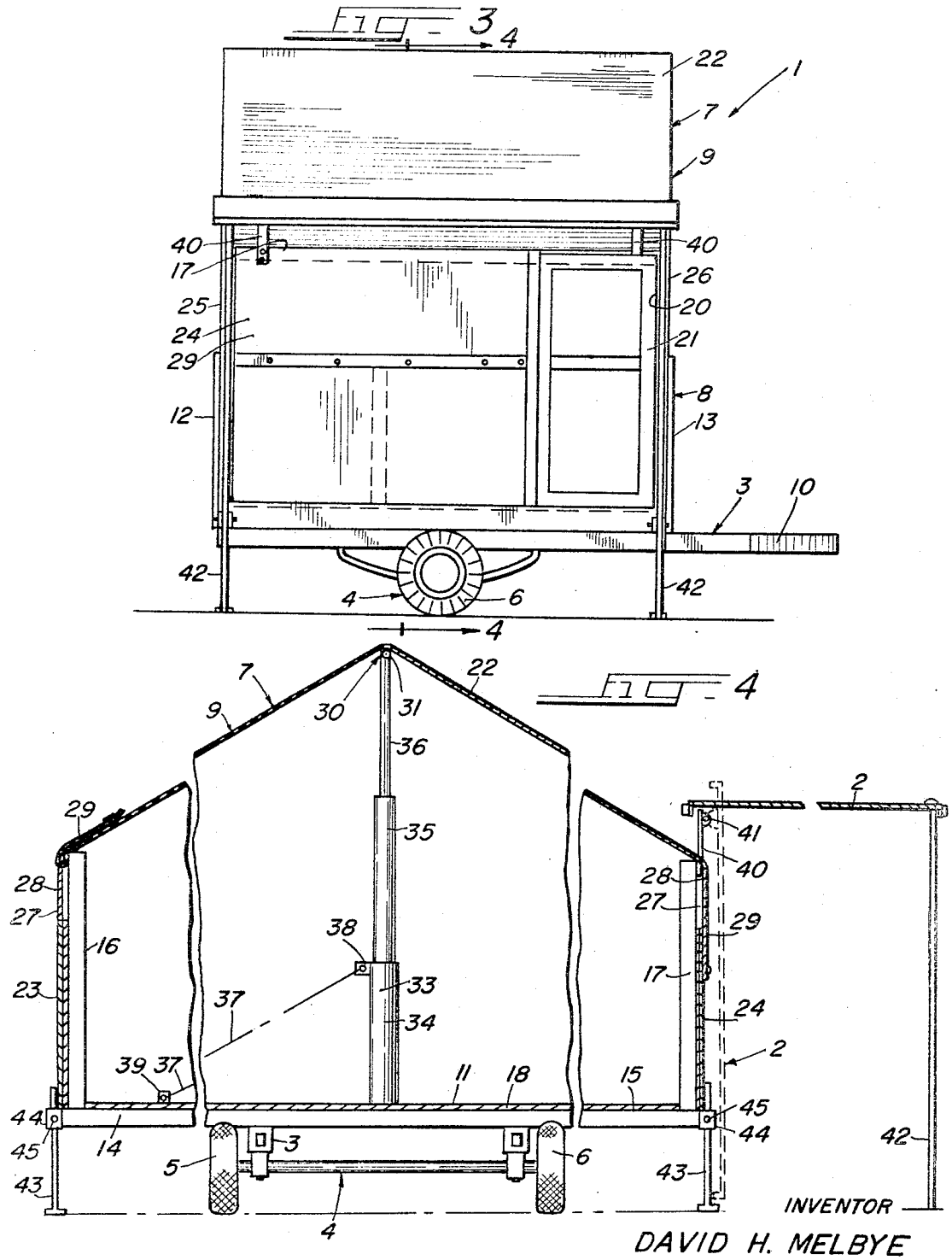

൩,൩൩൩,൮൮൪

United States Patent Office

Patented Aug. 1, 1967

3,333,884
TRAILERS
David H. Melbye, 4513 W. 101st St.,
Oak Lawn, Ill. 60453
Filed July 29, 1965, Ser. No. 475,641
7 Claims. (Cl. 296—23)

ABSTRACT OF THE DISCLOSURE

A trailer embodying a living quarter portion movable between expanded and contracted positions, and having a member shiftable between a cover-forming position in contracted position and a canopy-forming position in expanded position.

---

This invention relates to trailers, and, more particularly, to trailers which are particularly well-adapted for use as camping trailers.

It is a primary object of the present invention to afford a novel trailer construction.

Another object is to enable trailers to be afforded with a novel canopy member in a novel and expeditious manner.

Another object is to afford a novel cover member for trailers.

In the use of camping trailers, and the like, it is often desirable to have a canopy or awning structure, which affords shelter from the sun, rain, and the like, outside of and immediately adjacent to the trailer. It is an important object of the present invention to enable such a canopy to be afforded for trailers, and the like, in a novel and expeditious manner.

Trailers having canopies for affording shelter against the sun and the rain have heretofore been known in the art. However, such trailers heretofore known in the art have commonly had several common inherent disadvantages such as, for example, embodying the canopy as an appendage having no purpose other than that of affording a canopy or awning; embodying a canopy which was difficult or cumbersome to store; embodying a canopy which was difficult to erect; or affording a trailer construction which was impractical and inefficient in operation, and which was difficult and expensive to produce commercially, and the like. It is another important object of the present invention to overcome such disadvantages.

A further object of the present invention is to afford a novel trailer construction embodying a canopy construction forming an integral part thereof and constituted and arranged in a novel and expeditious manner.

Yet another object is to afford a novel trailer construction embodying a combination cover member-canopy member constituted and arranged in a novel and expeditious manner wherein, when the trailer is being transported from one place to another, the member affords an effective cover for closing the top thereof, and when the trailer is being used for living quarters, the member affords an effective canopy or awning projecting from a side wall of othe trailer.

An object ancillary to the foregoing is to enable such a member to be readily moved, in a novel and expeditious manner, between the canopy-affording and cover-affording positions.

A further object of the present invention is to afford a novel canopy construction which is practical and efficient in operation and which may be readily and economically produced commercially.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

FIG. 1 is a fragmentary front perspective view of a trailer embodying the principles of the present invention, showing the trailer in collapsed or closed condition for transporting, and the like;

FIG. 2 is a rear elevational view of the trailer shown in FIG. 1.

FIG. 3 is a side elevational view of the trailer shown in FIG. 1, showing the trailer disposed in open or erected condition for affording living and sleeping quarters.

FIG. 4 is a sectional view taken substantially along the line 4—4 in FIG. 3.

FIG. 5 is an enlarged, fragmentary, detail sectional view of a portion of the trailer shown in FIG. 4; and FIG. 6 is an enlarged, fragmentary, detail sectional view of a portion of the trailer shown in FIG. 4.

A camping trailer 1, embodying the principles of the present invention, is shown in the drawings to illustrate the preferred embodiment of the present invention.

The camping trailer 1, shown in the drawings, is of the same general construction as that shown in my United States Letters Patent 3,149,876, the application for which was filed Apr. 26, 1961, Ser. No. 112,807, except that the trailer 1 shown herein embodies a panel member 2 which affords a cover for the trailer 1 when the latter is disposed in collapsed position, FIG. 1, and which affords a canopy-member or awning member when the trailer 1 is disposed in erected or open position, FIG. 4.

The trailer 1 includes, in general, a supporting frame 3 mounted on suitable running gear 4, including a pair of wheels 5 and 6, and a living-quarter portion 7 mounted on and supported by the frame 3, FIGS. 1–4. The living-quarter portion 7 includes a body portion 8 and a tent portion 9, as will be discussed in greater detail presently.

The frame 3 is substantially rectangular in shape, and a tongue 10 projects forwardly therefrom, FIGS. 1 and 3. The tongue 10 may have any suitable type of trailer hitch, or the like, not shown, on the front end thereof for attaching the trailer 1 to an automobile, or the like.

The body portion 8 of the trailer 1 includes a floor 11, a rear wall 12, a front wall 13, two side walls 14 and 15, and two top walls 16 and 17, FIGS. 1 and 2. The floor 11 includes flooring 18 mounted on and secured to the frame 3 in any suitable manner.

The side walls 14 and 15 of the body portion 7 are hingedly connected to respective opposite side edges of the floor 15 by suitable hinges 19, FIG. 2, and are disposed in substantially upright, perpendicular relation to the floor 11 when the trailer body 7 is in transporting condition. The hinges 19 are disposed between the lower ends of the end walls 14 and 15 and adjacent side edges of the floor 11, and the side walls 14 and 15 are pivotable on the hinges 19 from the upright position shown in solid lines in FIG. 2 to substantially horizontally extending position, as shown in FIG. 4, wherein the side walls 14 and 15 are disposed in uniplanar relation to each other and to the floor 11.

The top walls 16 and 17 are rigidly secured to the side edge portions of the side walls 14 and 15, respectively, which constitute the upper edge portions of the side walls 14 and 15 when the latter are disposed in upright position as shown in FIG. 2. The top walls 16 and 17 project from the side walls 14 and 15 in substantially perpendicular relation thereto. When the trailer 1 is in transporting position, as shown in FIG. 2, the top walls 16 and 17 project substantially horizontally inwardly from the side walls 14 and 15, respectively, and terminate at their inner ends in overlapped relation to each other, with the top panel 17 disposed above the top panel 16, FIG. 2.

The top walls 16 and 17 of the body portion 8 are movable with the side walls 15 and 16, respectively, between the horizontally extending position shown in FIG. 2 to the upright position shown in FIG. 4, in which latter position they project substantially vertically upwardly from the outer longitudinal edge portions of the then horizontally extending side walls 14 and 15. The top wall 17 has a doorway 20 formed in the front end portion thereof, FIG. 3. The doorway 20 extends across substantially the full width of the top wall 17 and a door 21 is mounted in the doorway 20 and hingedly secured to the top wall 17.

The tent portion 9 of the living-quarter portion 7 of the trailer 1 includes a top wall 22, two oppositely disposed side walls 23 and 24, and two oppositely disposed end walls 25 and 26, FIGS. 3 and 4. The two side walls 23 and 24 are disposed in overlying juxtaposition to the outer face of the top walls 16 and 17, of the body portion 8, respectively, and are nailed or otherwise suitably secured thereto. The lower edge portions of the end walls 25 and 26 are similarly nailed or otherwise suitably secured to the ends of the floor 11 at the rear and front ends of the body portion 8, respectively, and are disposed between the end walls 12 and 13 of the body portion 8.

The main body portion of the tent 9 may be made of any suitable tent material, such as, for example, water-repellant canvas duck, or the like, and suitable windows may be afforded therein, such as, for example, the windows 27 shown in FIG. 4. The windows 27 may be formed in any suitable manner, but I prefer to form them by affording openings in the main body portion of the tent 9 and securing suitable flexible screening material 28, such as, for example, fabric mosquito netting, or the like, to the canvas body portion of the tent in covering relation to the openings. Flaps 29, which are of such size as to completely cover the adjacent windows 27, and which may be made of the aforementioned canvas duck, or the like, may be secured to the main body portion of the tent 9 in such position that they may be disposed in completely overlying relation to the windows 27 on the outside thereof, as shown on the right side of FIG. 4, or they may be disposed in raised position wherein they rest on the top 22 of the tent 29, as shown at the left side of FIG. 4.

An actuating mechanism 30, which is of the same general type embodied in the trailer shown in my aforementioned United States Letters Patent 3,149,876, is embodied in the trailer 1 for automatically erecting and collapsing the tent portion 9 upon movement of the walls 14–17 of the body portion 8 from the closed position shown in solid lines in FIG. 2 to the open position shown in FIG. 4, and from the open position shown in FIG. 4 to the closed position shown in FIG. 2, respectively. The actuating mechanism 30 includes a ridge pole 31 mounted on the upper ends of two telescoping posts 32 and 33, FIGS. 2 and 3, mounted in upright position on the rear and front end portions, respectively, of the floor 11, within the tent 9. The posts 32 and 33 are preferably secured to the floor 11 on the longitudinal center line of the trailer 1, and may be of any suitable construction, although I prefer that they embody the construction shown in the copending application for United States Letters Patent, of David H. Melbye and Robert K. Turney, Ser. No. 158,197, filed Dec. 11, 1961.

The posts 32 and 33 are disposed inwardly of, but in relatively closely adjacent relation to the walls 25 and 26, respectively, of the tent 9, and are so constituted and arranged that when they are disposed in fully extended position, as shown in FIG. 4, they are of sufficient length that the ridge pole 31 is disposed above the floor 11 a sufficient distance to support the longitudinal center of the tent 9 at the height desired thereof when the tent is in fully erected position. In collapsed position, the posts 32 and 33 are of such height that the ridge pole 31 thereon is disposed in the body portion 8 in downwardly spaced relation to the top walls 16 and 17, FIG. 2.

Each of the posts 32 and 33 includes an outer housing 34, an intermediate housing 35, and a center post or core 36 telescopingly arranged relative to each other, FIG. 4. Extension of the posts 32 and 33 from the collapsed position shown in FIG. 2 to the erected position shown in FIG. 4 is effected by tension on a cable 37 in the same manner as the posts disclosed in my aforementioned United States Letters Patent No. 3,149,876 and application, Ser. No. 158,197, cables, not shown, being attached between the portions 34 and 35, and the portions 35 and 36 in the manner disclosed in the aforementioned patent and application.

The cables 37 are trained over pulleys 38 mounted on the upper end portions of the outer housing 34 of the respective ones of the posts 32 and 33, one end of each of the cables 37 being secured to the lower end portion of a respective one of the intermediate housing 35, and the other end of each of the cables 37 being secured to a respective bracket 39 mounted on the side wall 14. The cables 37 are of such length that when the side wall 13 is disposed in upright position, as shown in solid lines in FIG. 2, the posts 32 and 33 are disposed in fully collapsed position, and, when the side walls 14 are moved from upright position to horizontally extending position, as shown in FIG. 4, the movement of the brackets 39 therewith is effective to pull the cables 37 into position to fully erect the posts 32 and 33, and thereby automatically move the tent 9 from stored position within the body portion 8 to fully erected position, as shown in FIG. 4.

The panel member 2 is preferably substantially rigid, in the sense that it is self-supporting. I prefer to construct it of a suitable material such as, for example, aluminum, or high impact strength synthetic resins or polymers such as high impact strength polystyrene, and the like. However, as will be appreciated by those skilled in the art, the panel member 2 may be constructed of other suitable material, such as, for example, canvas duck, or the like, mounted on a suitable supporting frame.

Two mounting brackets 40 are mounted on the front and the rear end portions, respectively, of the top wall 17, FIG. 3. The mounted brackets 40 are so disposed on the top wall 17 that when the latter is disposed in upright position, the brackets 40 project upwardly therefrom. The panel member 2 is hingedly connected to each of the mounting brackets 40 by suitable hinges 41 mounted on the free end portions of the brackets 40, FIG. 2.

The panel member 2, the top wall 17, the brackets 40 and the hinges 41 are so constituted and arranged that when the top wall 17 is disposed in closed position, the panel member 2 is disposed in overlying relation to the walls 12–15 in position to effectively close the top of the body portion 8 of the living-quarter portion 7 of the trailer 1, as shown in solid lines in FIGS. 1 and 2; and when the top wall 17 is disposed in open, substantially upright position, in the erected trailer 1, the panel member 2 may be disposed in substantially horizontally, outwardly extending relation to the living-quarter portion 7, as shown in solid lines in FIG. 4, to thereby afford a canopy or awning projecting outwardly from the doorway 20 and extending the full length of the living-quarter portion 7, FIGS. 3 and 4. When the panel member 2 is disposed in such canopy-affording position, the free edge portion thereof remote from the hinges 41 may be supported in any suitable manner such as, for example, by two posts 42 disposed in upright position on the ground below in underlying supporting engagement therewith, FIGS. 3, 4, and 6.

In the operation of my novel trailer 1, when it is being transported behind an automobile, or the like, it is disposed in closed position, as shown in FIGS. 1 and 2. If desired, releasable latches 43 of any suitable type readily available on the market may be mounted on the side walls 14 and 15 and the panel member 2, FIGS. 1 and 2, for releasably securing the panel member 2 in covering relation to the body portion 8 during transporting of the trailer 1.

When my novel trailer 1 arrives in closed position at a camp site, or the like, it may be quickly and easily opened into erected position for affording living and sleeping quarters. This may be accomplished by first releasing the latches 43 and then swinging the top wall 17 and the side wall 15, with the panel member 2 attached to the top wall 17, into fully opened position, as shown in FIG. 4. During such opening swinging movement of the top wall 17, the panel member 2 remains in substantially parallel relation thereto, as illustrated in broken lines in FIG. 2, so that when the top wall 17 initially arrives in fully opened position, the panel member 2 is supported by the hinges 41 in substantially upright position, outwardly of the top wall 17, as shown in broken lines in FIG. 4.

Thereafter, the top wall 16 and the side wall 14 of the trailer 1 may be swung from fully closed position, as shown in FIG. 2, to fully opened position, as shown in FIG. 4, this movement of the side wall 14 being effective to extend the posts 32 and 33 and thereby automatically erect the tent 9. The panel member 2 may then be manually swung upwardly around the hinges 41 into substantially horizontally outwardly extending position, as shown in solid lines in FIG. 4, and the posts 42 may be disposed in supporting relation thereto to thereby afford an effective canopy or awning projecting outwardly from the side of the tent 9 in which the doorway 20 is located. Preferably, when the panel member 2 is disposed in the aforementioned canopy-affording position, it slopes slightly downwardly and outwardly away from the tent 9 so as to afford good drainage for rain and the like, outwardly away from the living-quarter portion 7 of the trailer 1. The mounting brackets 40 are so disposed on the top wall 17, that when the panel member 2 is disposed in canopy-affording position, a longitudinal edge of the latter which is adjacent to the living-quarter portion 7, is disposed above the top 22 of the tent 9 in upwardly spaced relation thereto, FIG. 4.

If desired, when the trailer 1 is disposed in fully erected position, supporting rods 43 may be mounted in brackets 44 projecting outwardly from the lower end portions of the top walls 16 and 17, and pins or bolts 45 may be inserted through the rods 43 and the respective brackets 44 to secure the rods 43 in position to support the outer lateral edges of the side walls 14 and 15 from the ground or other supporting surface on which the trailer 1 is disposed.

When it is desired to "break camp," this may be readily accomplished with my novel trailer 1. The operator may first remove the rods 43 from the brackets 42, and the side wall 14 and the top wall 16 may be swung upwardly as a unit from the fully opened position shown in FIG. 4 to the fully collapsed position shown in FIG. 2. This movement of the side wall 14 permits the weight of the tent 9 to fully collapse the posts 32 and 33 into the fully collapsed position shown in FIG. 2. During this movement of the posts 32 and 33, the top wall 22 and the end walls 25 and 26 of the tent 9 move downwardly into body portion 8 of the trailer 1. Thereafter, the rods 42 may be removed from supporting position relative to the panel member 2, and the latter may be permitted to swing downwardly into the upright position illustrated in broken lines in FIG. 4. The side wall 15 and the top wall 17 may then be swung upwardly as a unit from the fully opened position shown in FIG. 4 to the fully closed position shown in FIG. 3, to thereby automatically dispose the panel member 2 in effective closing relation to the top of the body portion 8, as shown in solid lines in FIG. 2. The latches 43 may then be secured, and the trailer 1 is ready for transporting to another location or camp site.

From the foregoing, it will be seen that the present invention affords a novel trailer construction wherein the parts thereof are constituted and arranged so as to afford a practical and effective canopy member in a novel and expeditious manner.

Also, it will be seen that the present invention affords a novel cover member for a trailer.

In addition, it will be seen that the present invention affords a novel trailer embodying a novel canopy construction which may be quickly and easily moved into and out of erected position.

Also, it will be seen that the present invention affords a novel trailer embodying a panel member constituted and arranged in a novel and expeditious manner whereby it affords a novel combination cover-canopy structure.

Also, it will be seen that the present invention affords a novel trailer embodying a canopy which, when in stored position, not only does not waste space, but performs a useful function, namely, affords an effective cover for the trailer.

In addition, it will be seen that the present invention affords a novel trailer of the aforementioned type which is practical and efficient in operation, and which may be readily and economically produced commercially.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. In a trailer embodying supporting means, a body portion mounted on said supporting means and supported thereby, a tent portion mounted on said body portion, said body portion having two side walls movable between an upstanding position and a horizontally extending position, and two top walls movable with respective ones of said side walls between a horizontally extending position and an upstanding position, said top walls being disposed in said horizontally extending positions with one of said top walls disposed above the other of said top walls when said side walls are disposed in said upstanding position, and means operatively connected to said tent and said side wall with which said other top wall is movable for automatically erecting said tent when said last mentioned side wall is moved from said upstanding position to said horizontally extending position, said tent being automatically collapsible from erected position to a collapsed position within said body portion when said last mentioned side wall is moved from said horizontally extending position to said upstanding position, (a) a panel member mounted on and supported by said one top wall,
(b) said panel member
(1) being disposed in position to cover and close the top of said body portion when said one top wall is disposed in said horizontally extending position,
(2) being disposed in a second position horizontally outwardly of said body portion when said one top wall is disposed in said upstanding position, and
(3) being automatically movable with said one top wall into said one position and said second position upon said movement of said one top wall into said horizontally extending position and said upstanding position, respectively.

2. The combination defined in claim 1, and in which
(a) said panel member has a third position wherein it extends in a generally horizontal direction outwardly of said body portion, and
(b) said panel member
(1) is hingedly connected to said one top wall, and
(2) is pivotable relative thereto between said second and third positions when said one top wall is disposed in said upstanding position.

3. A trailer comprising
(a) a living-quarter portion,
(b) means for supporting said living-quarter portion,
(c) said living-quarter portion
(1) being movable between an expanded position and a contracted position, and
(2) including a wall movable between a substantially horizontally extending position and an upstanding position during movement of said living-quarter portion between said expanded and contracted positions, and
(d) a member pivotally mounted on said wall
(e) said member being movable with said wall
(1) into one position effective to cover said living-quarter portion when the latter is in said contracted position, and
(2) into another position wherein it is disposed outwardly from said living-quarter portion,
(f) said member being movable relative to said wall from said other position into a third position to afford a canopy when said living-quarter portion is disposed in said expanded position.

4. A trailer as defined in claim 3, and in which
(a) said member comprises a self-supporting panel member.

5. A trailer as defined in claim 3, and in which
(a) said member comprises a substantially rigid metal panel member.

6. A trailer as defined in claim 3, and in which
(a) said living-quarter portion
(1) expands both vertically and horizontally during movement from said contracted position to said expanded position, and
(2) contracts both vertically and horizontally during movement from said expanded position to said contracted position.

7. A trailer comprising
(a) a body portion,
(b) means for supporting said body portion,
(c) a tent portion supported by said body portion,
(d) said tent portion being movable between
(1) an erected position wherein it projects upwardly above said body portion, and
(2) a collapsed position wherein it is disposed within said body portion, and
(e) a panel member movable between
(1) one position wherein it closes the top of said body portion when said tent is disposed in said collapsed position, and
(2) a second position wherein it extends outwardly in a generally horizontal direction from said tent above said body portion when said tent is disposed in said erected position,
(f) said body portion including parts movable between
(1) open and
(2) closed position, and
(g) said panel member being
(1) operatively connected to one of said parts and
(2) movable therewith between
(a') said one position and
(b') a third position wherein it is disposed horizontally outwardly of said body portion,
(3) pivotable on said one part between said second and third positions when said parts are disposed in said open position, and
(4) automatically movable from said third position to said one position upon said movement of said one part from said open position to closed position.

References Cited

UNITED STATES PATENTS 2,481,230   9/1949   MacDonald _____ 135—5
2,853,338   9/1958   Stanley _____ 296—23

BENJAMIN HERSH, *Primary Examiner.*

P. GOODMAN, *Assistant Examiner.*